No. 669,606.  
B. WAKEMAN.  
PNEUMATIC TIRE.  
(Application filed Dec. 23, 1899.)  
Patented Mar. 12, 1901.

(No Model.)

Witnesses  
Edward K. Nicholson  
Anna Wanamaker

Inventor  
Bacon Wakeman  
By Chamberlain & Newman  
Attorneys

UNITED STATES PATENT OFFICE.

BACON WAKEMAN, OF FAIRFIELD, CONNECTICUT.

PNEUMATIC TIRE.

SPECIFICATION forming part of Letters Patent No. 669,606, dated March 12, 1901.

Application filed December 23, 1899. Serial No. 741,488. (No model.)

*To all whom it may concern:*

Be it known that I, BACON WAKEMAN, a citizen of the United States, and a resident of Fairfield, in the county of Fairfield and State of Connecticut, have invented certain new and useful Improvements in Pneumatic Tires, of which the following is a specification.

This invention relates to new and useful improvements in tires such as are used upon automobiles, bicycles, and other vehicles, preferably those of the pneumatic and nonpuncturable type.

Numerous constructions of tires and forms of armor have been invented with a view of preventing puncturing; but these are more or less defective for various reasons. Among the constructions I have particularly in mind are those using an intermediate layer of fibrous material, such as raw and manufactured cotton. The raw cotton, while very desirable for some purposes, has its objections, among which may be mentioned the fact that the material quickly becomes matted and hard through the absorption of moisture and use, thus detracting from the flexible qualities of the tire.

It is therefore the object of my invention to provide a tire which will embody all the desirable features of the fibrous or cotton armored tires and in addition possess additional advantages which go to produce a more perfect tire than any now upon the market, said object being accomplished by the combined use of two materials, the first one of which possesses the best-known resilient nonpuncturable material and an inner layer of a more resilient and likewise more flexible substance.

With the above object in view my invention resides and consists in the novel construction and combination of parts set forth in the accompanying sheet of drawings, illustrating my invention and upon which similar letters of reference denote like or corresponding parts throughout both figures, and of which—

Figure 1:
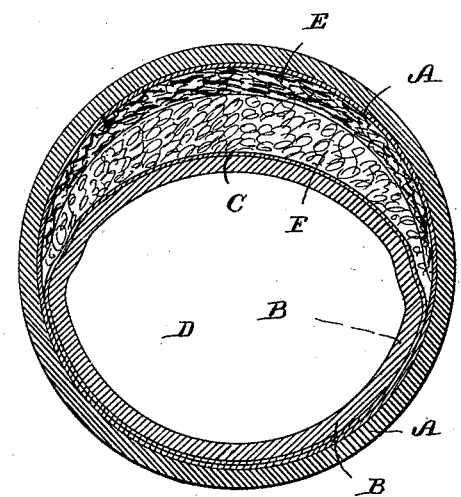
Figure 2:
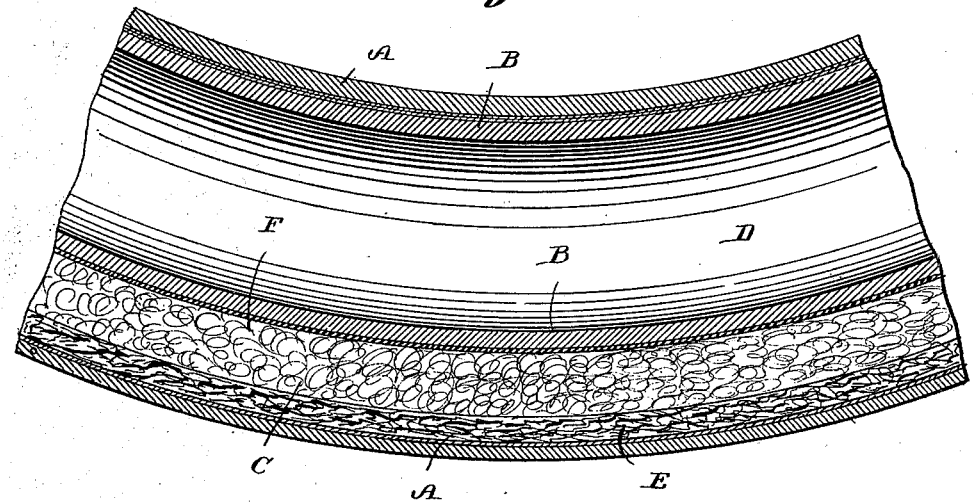

Figure 1 shows a vertical cross-sectional view of a tire embodying my invention, and Fig. 2 shows a central vertical longitudinal sectional view of a portion of a tire embodying my improvement.

It is particularly desirable that a double-compartment tire, such as shown in my drawings, should at all times be yieldable and readily give to compensate for any unevenness or obstruction in the road-bed. This is theoretically provided for by the combined air-pressure of the inner tube and the yieldable quality of the fibrous or cotton material comprising the armor. In practice, however, as before stated, cotton of this nature will sooner or later become solidified, owing to the continued pressure brought to bear or the inactive or non-durable resilient qualities of the cotton employed. In order, therefore, to accomplish the purpose desired—viz., to produce a fibrous or cotton armor for pneumatic tires which will remain flexible and durable— I employ an additional element within the outer tube, thus producing a new and improved combination.

Referring in detail to the characters of reference marked upon the drawings, A indicates the outer tube, and B the inner, and C the outer compartment, and D the inner or inflatable compartment. Within the outer compartment and adjacent to the tread of the tube A, I insert a comparatively thin layer of raw cotton E or other fibrous material which comprises the armor and in practice serves to receive and repair such damages as are liable to occur. In addition to this protective material I employ an inner filling of resilient material F—such as metal wool, steel, brass, &c.—which is of a particularly yieldable and durable nature and also adds very greatly to the tire by reason of the well recognized and known fact of the toughness and resisting properties of such material. This wire wool is employed in an intertwining and interlocking entangled condition, akin to the curled hair in a mattress, but care is taken when molding a tire to distribute it against the cotton and throughout the tire in proper relative proportions. Owing to the wiry qualities of this material it is possessed of an unequaled amount of resilient energy and endurance. In practice it at all times retains the cotton or fibrous armor against the tread and at the same time acts with the inflated tube in compensating for the obstructions in the road.

In some instances the relative arrangement of materials within my tire may be reversed—that is, the wire wool may be placed against the outer periphery and the cotton upon the inside, or, in fact, the cotton might be omitted entirely, thus employing an armor comprised solely of curled hair.

Having thus described my invention, what I claim, and desire to secure by Letters Patent, is—

1. A double-compartment pneumatic tire of the class described, one compartment of which is for compressed air and the other filled with an armor-proof or non-puncturable material comprised of an outer layer of fibrous material and an inner layer of resilient metal wire or wool, substantially as set forth and described.

2. In a double-compartment pneumatic tire of the class described, the same consisting of one compartment for compressed air and the other containing a combination armor of a layer of raw cotton and a layer of resilient metal, wire or wool, as and for the purposes set forth.

Signed at Bridgeport, Fairfield county, Connecticut, this 18th day of December, A. D. 1899.

BACON WAKEMAN.

Witnesses:
C. M. NEWMAN,
EDWARD K. NICHOLSON.